(12) United States Patent
Flowers et al.

(10) Patent No.: US 11,572,974 B2
(45) Date of Patent: Feb. 7, 2023

(54) MAGNETICALLY-ACTUATED LATCH MECHANISM FOR DISPLAY MODULE

(71) Applicant: Daktronics, Inc., Brookings, SD (US)

(72) Inventors: Ashton Flowers, Brookings, SD (US); Kent Shane Miller, Brookings, SD (US); Jon Settingsgard, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 616 days.

(21) Appl. No.: 16/567,601

(22) Filed: Sep. 11, 2019

(65) Prior Publication Data

US 2020/0080683 A1    Mar. 12, 2020

Related U.S. Application Data

(60) Provisional application No. 62/729,703, filed on Sep. 11, 2018.

(51) Int. Cl.
*F16M 11/04* (2006.01)
*G09F 9/302* (2006.01)
*F16B 1/00* (2006.01)

(52) U.S. Cl.
CPC ......... *F16M 11/041* (2013.01); *G09F 9/3026* (2013.01); *F16B 2001/0035* (2013.01); *G09G 2300/026* (2013.01)

(58) Field of Classification Search
CPC combination set(s) only.
See application file for complete search history.

(56) References Cited

U.S. PATENT DOCUMENTS

2007/0204500 A1* 9/2007 Splittgerber ............. A47G 1/06
40/781
2011/0001025 A1* 1/2011 Fiedler ................. H01F 7/0242
248/206.5

(Continued)

FOREIGN PATENT DOCUMENTS

| WO | WO-2016109439 A1 | 7/2016 |
| WO | WO-2016208918 A1 | 12/2016 |
| WO | WO-2020055988 A1 | 3/2020 |

OTHER PUBLICATIONS

"International Application Serial No. PCT/US2019/050593, International Search Report dated Dec. 2, 2019", 6 pgs.

(Continued)

*Primary Examiner* — Monica E Millner
(74) *Attorney, Agent, or Firm* — Schwegman Lundberg & Woessner, P.A.

(57) ABSTRACT

A display module comprises a support, a plurality of light-emitting elements coupled to the support and a latch mechanism to removeably couple the support to a chassis. The latch mechanism includes a movable member, a latch member, and a linkage mechanism. The movable member is moved from a first position to a second position when magnetically engaged by a tool magnet. The latch member moves between a first latch member position and a second latch member position and can engage a chassis mating structure when in the first latch member position. The linkage mechanism mechanically connects the movable member to the latch member so that they move together such that the latch member is in the first latch member position when the movable member is in the first position and is in the second latch member position when the movable member is in the second position.

20 Claims, 9 Drawing Sheets

(56) References Cited

U.S. PATENT DOCUMENTS

| | | | |
|---|---|---|---|
| 2014/0160363 A1* | 6/2014 | Mutschelknaus | H05K 3/284 |
| | | | 348/799 |
| 2016/0210886 A1* | 7/2016 | Brashnyk | F16M 11/041 |
| 2016/0255731 A1 | 9/2016 | Ran | |
| 2017/0006727 A1* | 1/2017 | Ryu | H01L 25/0753 |
| 2019/0057799 A1* | 2/2019 | Habeck | H05K 5/0221 |
| 2019/0059166 A1* | 2/2019 | Habeck | G09F 9/3026 |
| 2019/0208655 A1* | 7/2019 | Schafer | H05K 5/0221 |
| 2019/0289729 A1* | 9/2019 | Nguyen | G09F 9/3026 |

OTHER PUBLICATIONS

"International Application Serial No. PCT/US2019/050593, Written Opinion dated Dec. 2, 2019", 6 pgs.

"Australian Application Serial No. 2019337584, First Examination Report dated Feb. 25, 2022", 3 pgs.

"European Application Serial No. 19782814.8, Communication Pursuant to Article 94(3) EPC dated May 25, 2022", 8 pgs.

"International Application Serial No. PCT/US2019/050593, International Preliminary Report on Patentability dated Mar. 25, 2021", 8 pgs.

"European Application Serial No. 19782814.8, Response filed Sep. 12, 2022 to Communication Pursuant to Article 94(3) EPC dated May 25, 2022", 37 pgs.

* cited by examiner

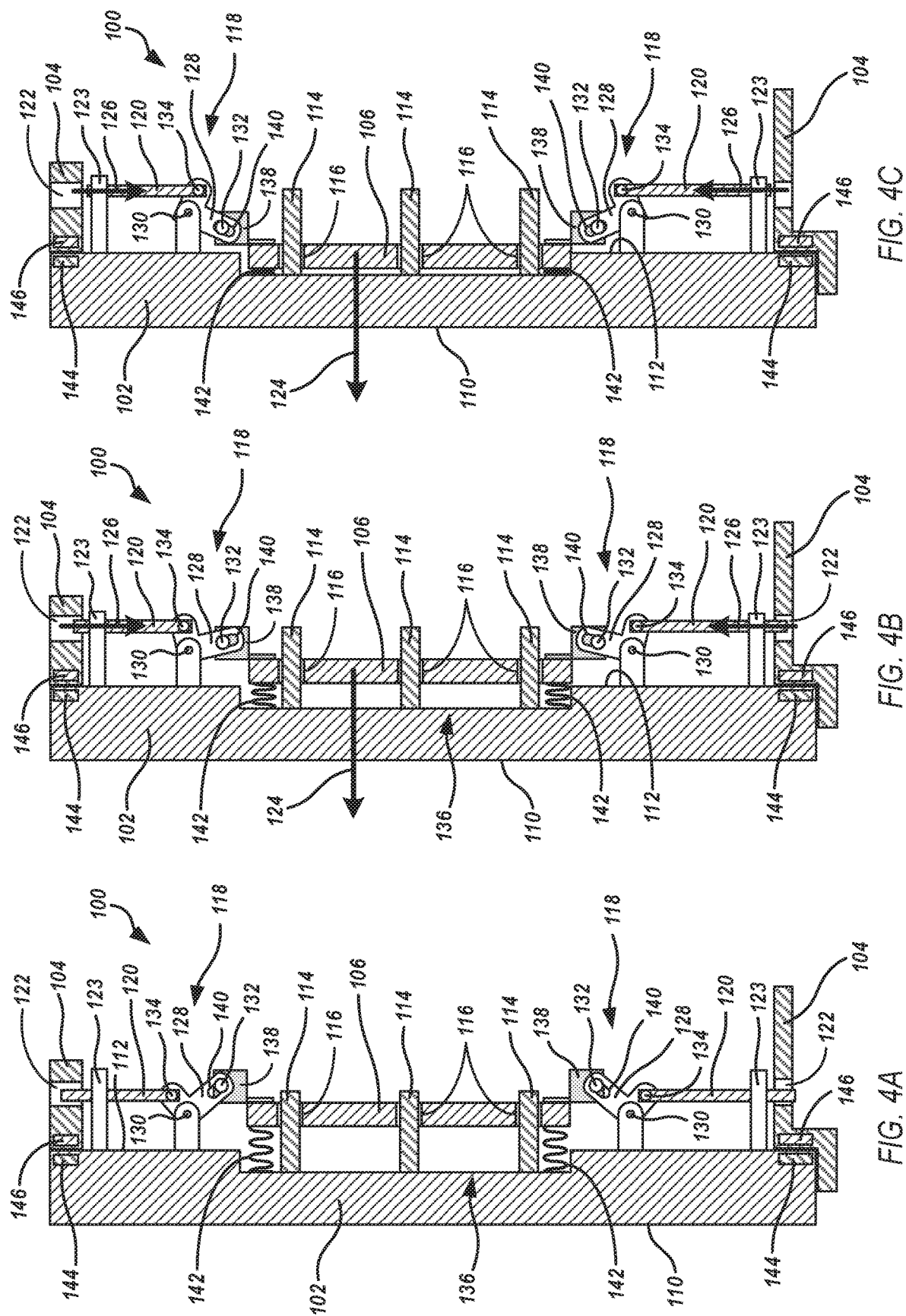

MAGNETICALLY-ACTUATED LATCH MECHANISM FOR DISPLAY MODULE

CROSS-REFERENCE TO RELATED APPLICATION

This application claims the benefit of priority to U.S. Provisional Patent Application Ser. No. 62/729,703, titled "MAGNETICALLY-ACTUATED LATCH MECHANISM FOR DISPLAY MODULE," filed Sep. 11, 2018, the disclosure of which is incorporated herein in its entirety by reference.

BACKGROUND

Displays comprising a plurality of light-emitting elements are used to display one or more of textual, graphical, or video information. In some applications, such as digital billboards or scoreboards, individual display modules are connected to one or more support structures and operated collectively to form a larger display. The individual display modules can be connected to a support structure with removable coupling mechanisms or structures so that display modules can be removed for maintenance or replacement.

SUMMARY

The present disclosure describes a latching mechanism for a display module that can be used in a larger display. The latching mechanism includes a magnetically-actuated mechanism that can be activated with a tool from a front side of the display.

In an example, present disclosure describes a display module that comprises a module support structure, a plurality of light-emitting elements coupled to the module support structure, and one or more latch mechanisms configured to removeably couple the module support structure to a support chassis. In an example, each of the one or more latch mechanisms includes a movable plate comprising a magnetizable structure that is magnetically engageable by a magnet or magnetic device of a tool, wherein the movable plate is movably coupled to the module support structure and is movable in a first direction between a first plate position and a second plate position, and wherein the movable member is moved from the first plate position to the second plate position when the magnet or magnetic device of the tool magnetically engages the movable member, a latch member movable in a second direction between a first latch member position and a second latch member position, wherein the latch member engages a corresponding mating structure of the support chassis when the latch member is in the first latch member position, and a linkage mechanism mechanically connecting the movable plate to the latch member so that the movable plate and the latch member move together such that the latch member is in the first latch member position when the movable plate is in the first plate position and is in the second latch member position when the movable plate is in the second plate position, wherein the linkage mechanism translates motion of the movable plate in the first direction between the first plate position to motion in the second direction for the latch member between the first latch member position and the second latch member position.

BRIEF DESCRIPTION OF THE FIGURES

The drawings illustrate generally, by way of example, but not by way of limitation, various embodiments discussed in the present document.

FIGS. 4A-4C are cross-section side views of an example magnetically-actuated latch mechanism for securing a display module to a support chassis at three different stages of a process of changing the latch mechanism from a latched state to an unlatched state.

DETAILED DESCRIPTION

Figure 1:
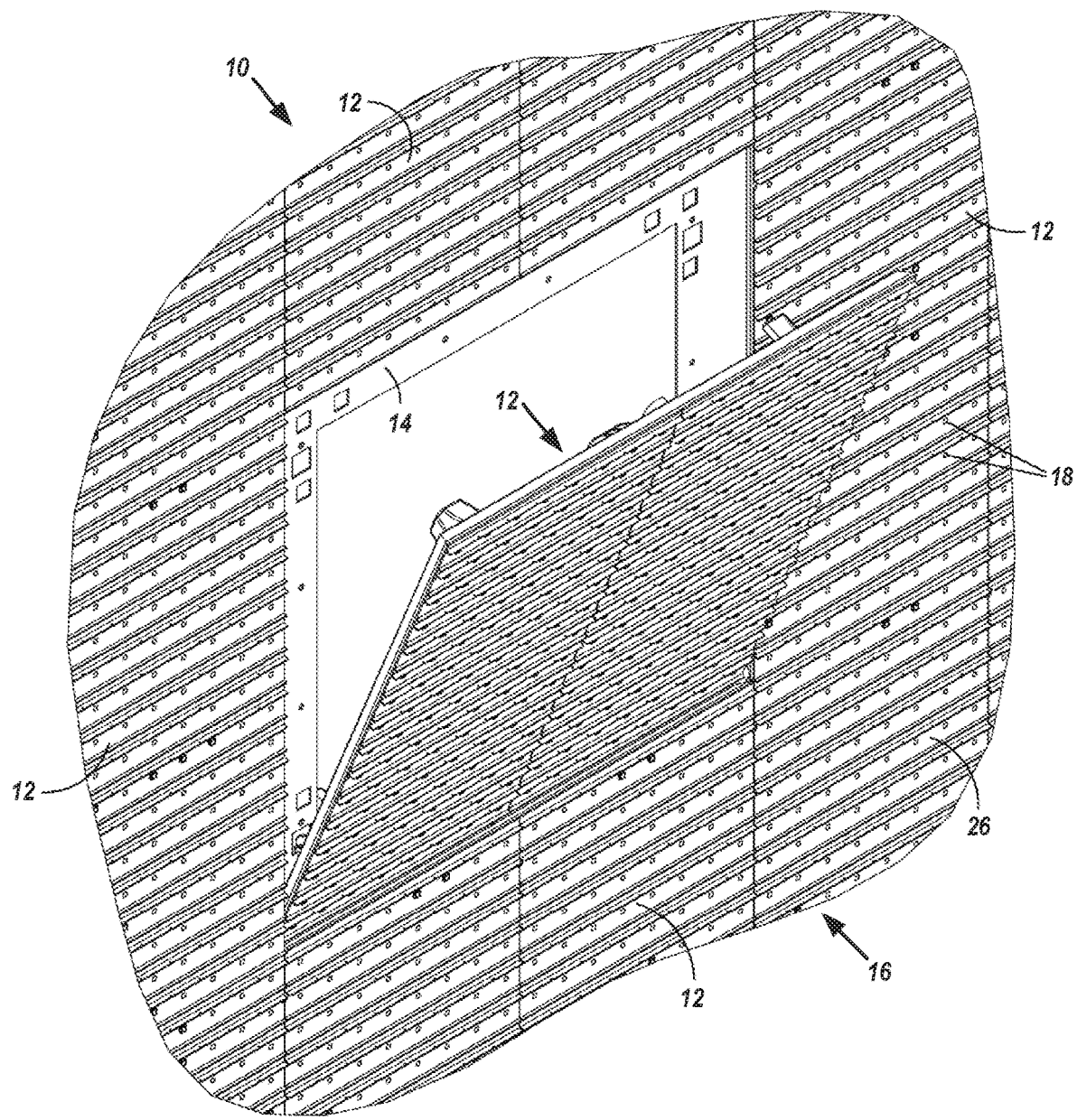
FIG. 1 is a partial perspective view of an example display comprising a plurality of individual display modules that are operated in a cooperative manner to display information on the light-emitting display.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," "an example," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "direction" used herein can refer to, unless otherwise specified, to a linear direction for the purposes of describing or characterizing a physical location of a particular structure, for example to describe the physical location of one structure relative to another structure. In some specific examples, the term "direction" is used to refer to one or more reference directions for the purposes of describing or characterizing relative positioning of one structure relative to another. For example, a common set of reference directions that is well known to those of skill in the art are the directions used to describe three-dimensional Euclidean space, and in particular the directions associated with each axis of a three-dimensional Cartesian coordinate system. As will be appreciated by those having skill in the art, Cartesian coordinates are often used to define positions within a three-dimensional space by defining three imaginary reference axes, typically named the "x-axis," the "y-axis," and the "z-axis," which are pairwise perpendicular. These axes can also be used to define a "direction" associated with each axis, referred to herein as an "x-direction" defined as a linear direction that is parallel to the x-axis (but not necessarily coincident with the x-axis), a "y-direction" defined as a linear direction that is parallel to the y-axis (but not necessarily coincident with the y-axis), and a "z-direction" defined as a linear direction that is parallel to the z-axis (but not necessarily coincident with the z-axis).

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Any use of section headings is intended to aid reading of the document and is not to be interpreted as limiting, and information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the disclosed method, except when a temporal or operational sequence is explicitly recited. Furthermore, specified acts can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first and steps B, C, D, and E can be carried out in any sequence between steps A and E, and that the sequence still falls within the literal scope of the claimed process. A given step or sub-set of steps may also be repeated.

Electronic Display

FIG. 1 shows an example of an electronic information display 10 (also referred to simply as "display 10") that is configured to display one or more of graphics, video, or text. For the sake of brevity, this disclosure will refer to the information that is presented on the display 10 as a "display image." However, those of skill in the art will appreciate that the display 10 is not limited solely to a graphical image or a static image, and will understand any recitation of a "display image" as referring to one or any combination of display graphical information (e.g., an image intended to represent a real or imaginary object or concept), video information (e.g., a series of two or more images displayed in succession so as to imitate motion), or textual information (e.g., letters, numbers, symbols, or other characters intended to represent language or other communication) being presented on the display 10 during the same period of time. The display 10 includes one or more individual display modules 12 mounted to one or more supports, such as a support chassis 14.

In an example, either a display module 12 or the support chassis 14, or both, includes a mounting structure or apparatus at one or more locations relative to each display module 12 to mount or couple the display module 12 to the support chassis 14, such as one or more latches. In an example, each display module 12 can be coupled to the support chassis 14 with one or more primary mounting structures or apparatuses (referred to as "primary mounts" for brevity) that provide for the main support for the weight of the display module 12. In other examples, each display module 12 can also include one or more secondary mounting structures or apparatuses (also referred to as "secondary mounts") in addition to the one or more primary mounts that can supplement the one or more primary mounts. In some examples, the one or more secondary mounts can be provided as a redundant or backup securing structure or apparatus that will keep the display module 12 at least loosely secured to the support chassis 14 in case the one or more primary mounts fail. For this reason, a secondary mount may also be referred to as a "safety latch" or "safety mount."

Continuing with FIG. 1, one of the display modules 12 is shown in a tilted position relative to the support chassis 14, which can occur when that display module 12 is in the process of being mounted to, or dismounted from, the support chassis 14. The other display modules 12 in the display 10 have already been mounted to the support chassis 14 with the primary mounts. In examples wherein the display 10 is formed from a plurality of the display modules 12, the plurality of display modules 12 operate together so that the overall display 10 appears as a single, larger display surface 16.

The display 10 can be configured to display the display image on the display surface 16. A plurality of light-emitting elements 18 are mounted to the display surface 16. For example, each of light-emitting elements 18 can be mounted to one or more support structures of a corresponding display module 12, such as one or more of a circuit board, potting, or a module frame. The light-emitting elements 18 of all of the display modules 12 can be controlled in a cooperative manner so that the display 10 shows the display image on the display surface 16.

The light-emitting elements 18 can be any type of light-emitting technology known or yet to be discovered for the emission of light from a small area, e.g., so that from a distance the light from any particular light-emitting element 18 will appear to be a small point of light. As described in more detail below, in some examples each light-emitting element 18 is small enough such that it can cooperate with one or more additional light-emitting elements 18 in an area small enough so as to appear as an individual pixel, e.g., that will appear as a single discrete point of light, which can itself cooperate with a plurality of other pixels to form a visual representation of the display image being displayed on the display surface 16. In particular, the light-emitting elements 18 can be of any type of light-emitting technology that is or can be used for the display of visual information, such as video information, graphical information, or textual information. At the time of filing of the present application, light-emitting diodes (LEDs) are one of the most common light-emitting technologies in use for video or graphical displays of the type described herein. As such, for the sake of brevity, the remainder of the present disclosure will refer to light-emitting elements that can be used in a display, including the light-emitting elements 18 shown in the figures, will be referred to as LEDs 18. Those of skill in the art will appreciate, however, that any time the present disclosure uses the term "light-emitting element," "light-emitting diode" or "LED," it is referring not only to LEDs, as they are understood at the time of filing, but also refers to other light-emitting technologies and devices, including, but not limited to, liquid crystal display devices (LCDs), organic light-emitting diodes (OLEDs), light-emitting transistor devices (LETs), organic light-emitting transistors (OLETs), surface-conduction electron-emitter display devices (SEDs), field-emission display devices (FEDs), quantum dot display devices such as quantum dot liquid crystal display devices (QD-LCDs) or quantum dot light-emitting diode display devices (QD-LEDs), ferro-liquid display devices (FLDs), and thick-film dielectric electroluminescent devices (TDELs).

Figure 2:
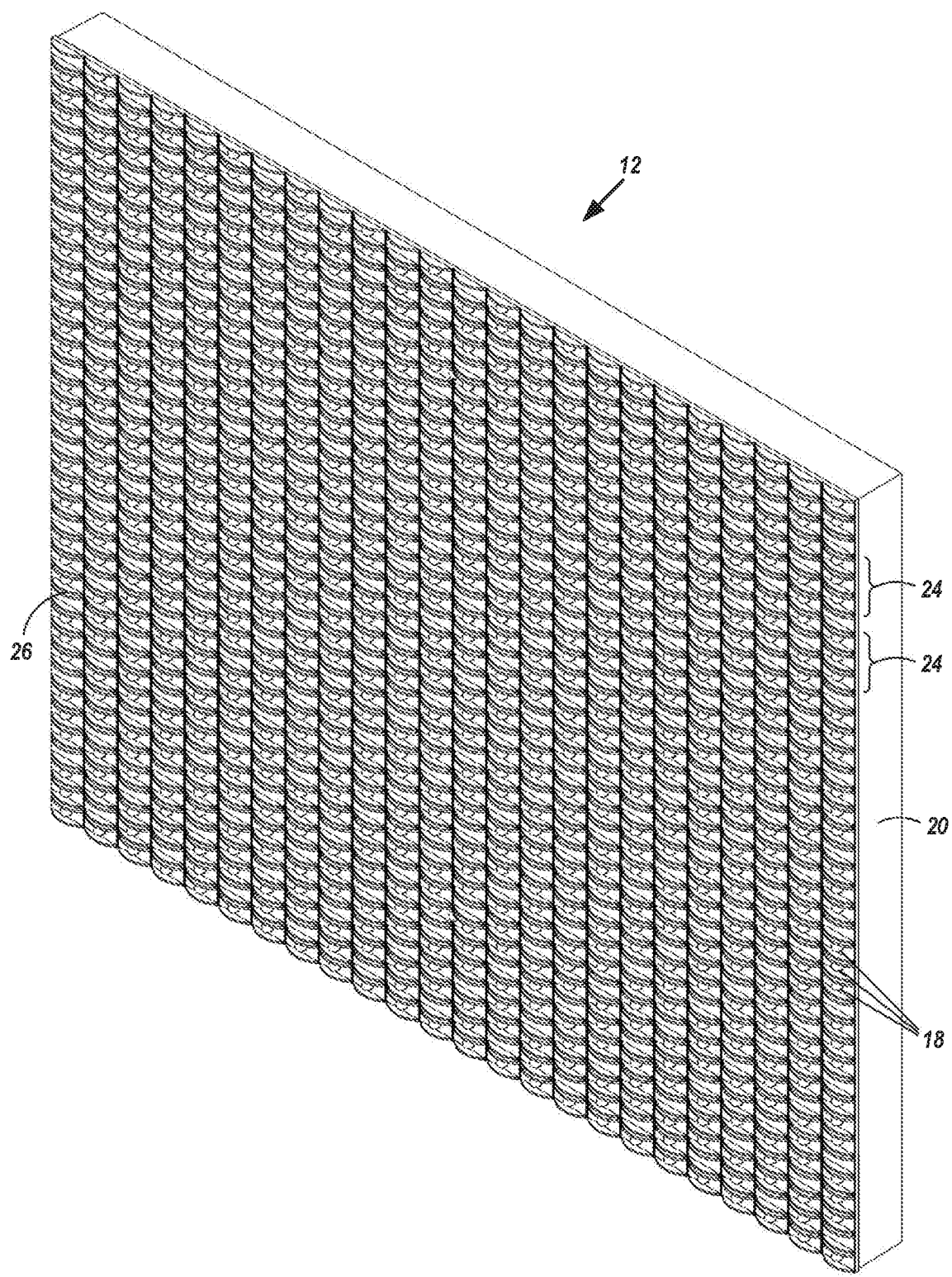
FIG. 2 is a perspective view of an example display module, which can be used as one of the individual display modules in the example display of FIG. 1.

FIG. 2 is a perspective view of an example display module 12 that can be used in the display 10 of FIG. 1. The example display module 12 includes a support structure, such as a module frame 20, which provides support for other components of the display module 12. In an example, the LEDs 18 and supporting electronics and circuitry for the LEDs 18 are coupled to the frame 20, for example by being electronically mounted to a circuit board (not shown), wherein the circuit board is connected to the frame 20, such that the circuit board and the frame 20 cooperatively form an overall support structure for the display module 12. A front face 22 of the display module 12 configured to provide for a display visual content. A plurality of the LEDs 18 are positioned on the front face 22 and the LEDs 18 can be operated in such a way that the display module 12 will display at least a portion of the display image (e.g., at least a portion of the overall video, graphic, or text that is to be shown on the display 10 as the display image). The front face 22 of the display module 12 is aligned and oriented relative to front faces 22 of one or more adjacently-positioned display modules 12 so that the front faces 22 combine and cooperatively form the overall display surface 16 of the full display 10 (shown in FIG. 1). The plurality of display modules 12 are operated together in such a way as to display the display image in a cohesive manner so that the entire display 10 appears to a viewer as a single display that is larger than the individual display modules 12.

In an example, the LEDs 18 are arranged into an array of pixels 24 (best seen in FIG. 2). Each pixel 24 includes one or more LEDs 18 grouped together in close proximity. The proximity of the pixels 24 allows the display 10 to be operated in such a way that they will appear to a viewer of the display 10 to form recognizable shapes, such as letters or numbers to display textual information or recognizable geometries to display graphical or video information. In some examples, the plurality of LEDs 18 include a plurality of different-colored LEDs 18 in each of the pixels 24 that can be cooperatively operated to display what appears to be a spectrum of different colors for the viewer of the display 10, e.g., using an additive color method. In a common example, each pixel 24 includes a red LED 18, a green LED 18, and a blue LED 18, wherein the red, green, and blue LEDs of each pixel 24 cooperate to provide essentially the entire color spectrum that is visible to humans based on whether one, two, or all three of the LEDs 18 in a pixel 24 are lit, and at what intensities. Those of skill in the art will appreciate that other combinations of specific colors of LEDs 18 can be selected for each pixel 24, depending on the specific colors and performance desired for the display 10. The display 10 can also provide a black or empty looking surface over a portion of the display, when desired, by deactivating or turning off the LEDs in a designated area of pixels 24.

In an example, the pixels 24 are arranged in a grid-like array, such as a grid including a specified number of rows and a specified number of columns of the pixels 24 that are spaced by a specified spacing distance. The display 10 can be controlled, for example with control software and/or one or more hardware controllers, so that the display image is broken down into coordinates. Each coordinate can correspond to a specific pixel location within the overall display 10, and the control software and/or the one or more hardware controllers can operate each pixel according to a program that specifies a condition for each coordinate within the display 10 and controls each of the pixels 24 so that it will appear to emit light that meets the condition specified. For example, if the display 10 is displaying a series of display images (either to appear as static images, or to appear as a moving video), the control software and/or the one or more hardware controllers can be fed the data corresponding to the series of display images, and the control software and/or the one or more hardware controllers can break the series of display images down into conditions for each pixel 24—such as the time within the series of messages, the color hue that a pixel 24 is to display at that time, the color saturation that the pixel 24 is to display at that time, and the intensity of the pixel 24 at that time. The control software and/or the one or more hardware controllers can also convert the information regarding color (e.g., hue and saturation) and intensity into specific operating parameters for each LED 18 in a particular pixel 24, such as the power that will be supplied to the red LED 18, the blue LED 18, and the green LED 18 in that pixel 24 and for how long in order to achieve the specified color and intensity at the specified time. The control software and/or the one or more hardware controllers can then send control signals to the pixels 24 or to individual LEDs 18 that can operate the pixels 24 according to the specified series of display images. Although a grid or grid-like array of LED pixels as summarized above is common, the display 10 described herein can use other arrangements of the LEDs 18 or other systems for addressing the LEDs 18 can be used without varying from the scope of the present disclosure.

In an example, the display 10 can include a face cover 26 that is placed over a front face of the display 10. The face cover 26 can provide protection for one or more of the LEDs 18, the display surface 16, and the electrical components of the display modules 12 that provide for the operation of the LEDs 12. The face cover 26 can also act to enhance contrast of the LEDs 18, especially in applications where the display 10 is used in an outdoor application such as an outdoor sports arena scoreboard or display board or a roadside advertising display such as an electronic billboard. In an example, each display module 12 includes a separate corresponding display module face cover, wherein the combination of all of the display module face covers collectively form the face cover 26.

Magnetically-Actuated Latch Mechanism

FIGS. 3A-3C and 4A-4B show an example of a magnetically-actuated latch mechanism 100 (referred to hereinafter simply as the "latch mechanism 100" for brevity) that can be used to secure a display module 102 to a support chassis 104. The support chassis 104 can be similar or identical to the support chassis 14 described above with respect to the display 10 in FIGS. 1 and 2. The display modules 102 can be similar or identical to any one of the display modules 12 described above with respect to the display 10 and can include one or more of the structures described above with respect to the display modules 12 (e.g., a support structure 20 such as a frame 20, a front face 22 onto which are mounted a plurality of light-emitting elements, such as LEDs 18, which can be arranged in grouped pixels 24). In other words, the example latch mechanism 100 described below can be used as a latching mechanism to secure any of the display modules 12 to the support chassis 14 in the display 10 of FIGS. 1 and 2.

In an example, the latch mechanism 100 is coupled to a support structure of the display module 102, such as a frame, which can be similar or identical to the support structure 20 described above with respect to the display modules 12 in FIGS. 1 and 2. The latch mechanism 100 includes a movable member 106, for example a planar or substantially planar body such as a plate 106, such that the movable member 106 will also be referred to as the "movable plate 106" or simply "the plate 106." The movable plate 106 is movable between a latched position and an unlatched position, corresponding to a latched state and an unlatched state of the latch mechanism 100, respectively. The plate 106 is moved by a magnetic engagement between the plate 106 and a corresponding module installation and de-installation tool 108 (referred to simply as a "module install tool 108" or "install tool 108" for brevity).

As used herein, the terms "magnetically engage" and "magnetically engageable," or similar terms such as "magnetic engagement," refer to the formation of a magnetic force between a first magnet and either a magnetizable structure (such as a magnetizable metal or other magnetizable material or a composite that includes a magnetizable material) or a second magnet or magnetic device. In an example, the magnetic force is a magnetic attraction force that acts to draw or attract the magnetizable material to the first magnet or to draw or attract the first and second magnets to each another, for example so that the movement of the plate 106 will tend to be toward the install tool 108.

Figure 3A:
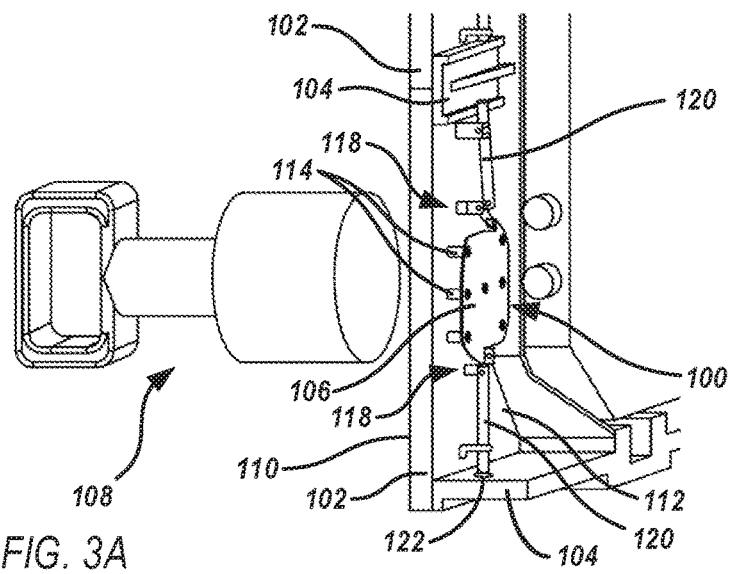
FIGS. 3A-3C are perspective views of an example magnetically-actuated latch mechanism for securing a display module to a support chassis at three different stages of a process of removing the module from the support chassis.
Figure 3B:
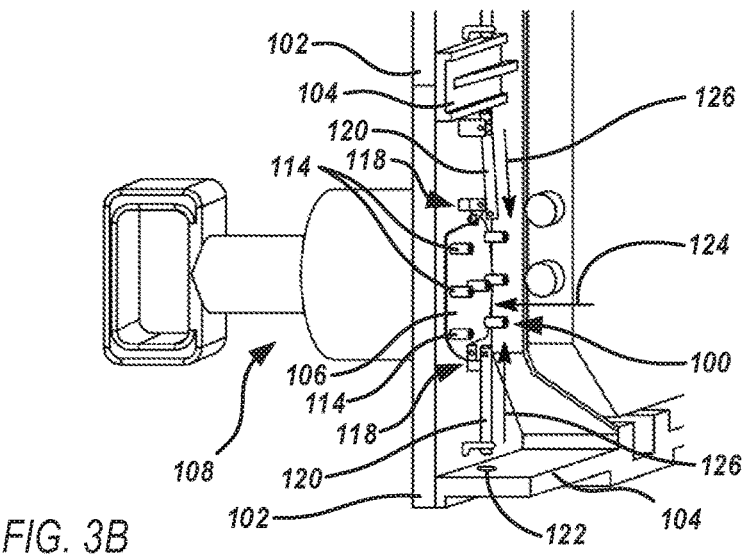
Figure 3C:
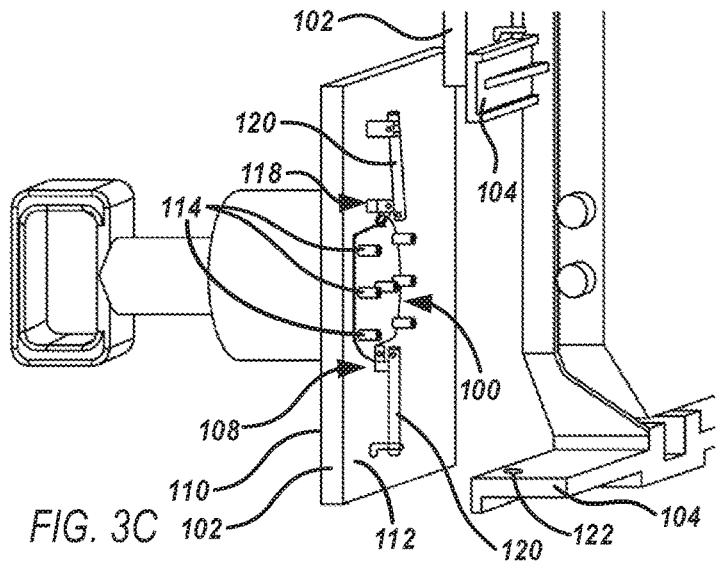
Figure 5:
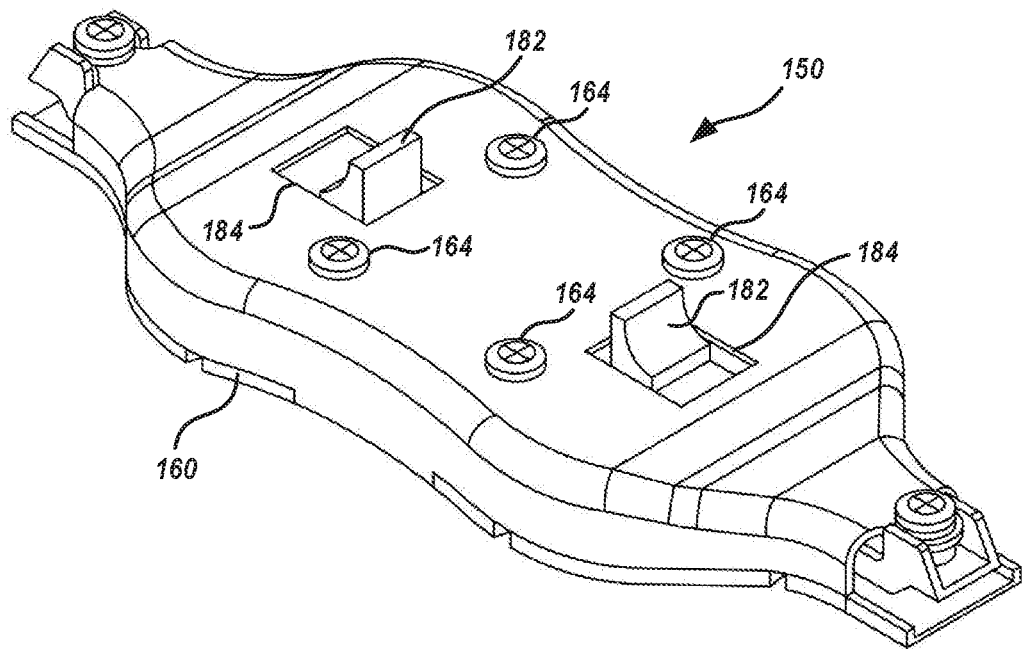
FIG. 5 is a perspective view of another example of a magnetically-actuated latch mechanism for securing a display module to a support chassis.

FIGS. 3A-3C show a perspective view of an example method of disengaging the latch mechanism 100 and removing the display module 102 from the support chassis 104 at three separate points in time. FIG. 3A shows the latch mechanism 100 in a latched state, corresponding to the latched position of the plate 106, which secures the display module 102 to the support chassis 104 and prevents the display module 102 from being separated from the support chassis 104 (described in more detail below). FIG. 3B shows the configuration of the example latch mechanism 100 after positioning the install tool 108 close to the display module 102. As noted above, a magnetic force between the plate 106 and the install tool 108 moves the plate 106 from the latched position to the unlatched position, which in turn changes the latch mechanism 100 from its latched state to its unlatched state to disengage the latch mechanism 100 from the support chassis 104. In FIG. 3B, the display module 102 is still in the same or substantially the same position relative to the support chassis 104 as it was in FIG. 3A, such that the display module 102 is not fully disengaged from the support chassis 104. FIG. 3C shows the method after the display module 102 has been pulled away from the support chassis 104, for example via the use of the magnetic force between the install tool 108 and the latch mechanism 100. At this point, the display module 102 has been fully disengaged from the support chassis 104.

FIGS. 4A-4C show a cross-sectional side view of the example latch mechanism 100 at various points in time during the changing of the latch mechanism 100 between the latched state (FIG. 4A) and the unlatched state (FIG. 4C). As described in more detail below, FIG. 4B shows an intermediate state between the fully latched state (as in FIGS. 3A and 4A) and the fully unlatched state (as in FIGS. 3B and 4C). Specifically, FIG. 4B shows a point in time where the plate 106 has only moved a portion of the distance between the latched position (e.g., a rearmost position relative to the display module 102 as in FIG. 4A) and the unlatched position (e.g., a forward-most position relative to the display module 102 as in FIG. 4C) so that the plate 106 is in an intermediate position between the latched position and the unlatched position. FIGS. 4A-4C do not show the presence of the install tool 108, but those of skill in the art will understand that the install tool 108 can be present and in position to provide a magnetic force to drive the motion of the plate 106. The structures in FIGS. 3A-3C and 4A-4C are not necessarily drawn to scale—in particular, the structures of the latch mechanism are shown as being larger, relative to the display module 102, than they might actually be for the latch mechanism 100 in order to better illustrate the features and motion of the latch mechanism 100.

In an example, the install tool 108 includes a magnet or a magnetic device (such as an electromagnetic device) that generates a magnetic field to magnetically engage a magnetizable material (e.g., a magnetizable metal or polymer) that is part of the magnetizable plate 106. Alternatively, the plate 106 can comprises a magnet or magnetic device that generates a magnetic field to magnetically engage a corresponding magnetizable structure on the install tool 108, or both the plate 106 and the install tool 108 can each include a magnet or magnet device that magnetically engage each other.

In the case of the magnetic engagement between the install tool 108 and the plate 106, the magnetic force has sufficient magnitude so that when the magnetic force acts between the plate 106 and the install tool 108, the plate 106 moves from the latched position (shown in FIGS. 3A and 4A) to the unlatched position (shown in FIGS. 3B, 3C, and 4C). In an example, the magnitude of a magnetic attraction force between the install tool 108 and the plate 106 can be large enough to be a "holding force" that can support the entire weight of the display module 102. Such a holding force can allow a user to pull the display module 102 away from the support chassis 104 using only the install tool 108 or to hold the display module 102 using only the install tool 108.

In an example, when in the latched position, the plate 106 is in a more rearward position relative to the display module 102 (e.g., more to the right relative to the display module 102, as in FIGS. 3A and 4A) and when in the unlatched position the plate 106 is in a more forward position relative to the display module 102 (e.g., more to the left relative to the display module 102, as in FIGS. 3B and 4C). In an example, the install tool 108 can be positioned in front of the display module 102, such as in front of or against a front face 110 of the display module 102, in a position that is aligned or substantially aligned with the location of the plate 106. The front face 110 of the display module 102 can be similar or identical to the front face 22 described above with respect to the display modules 12 in FIGS. 1 and 2. For example, the front face 110 can be planar or substantially planar and can form a major surface of the support structure of the module 102 (e.g., the front face 110 can be on a front part of a frame of the display module 102), which can be a face onto which the plurality of LEDs are mounted in grouped pixels. When the install tool 108 is positioned relative to the plate 106, the magnetic force between the install tool 108 and the plate 106 acts to move the plate 106 forward from the latched position and toward the unlatched position.

In an example, the plate 106 is coupled to the display module 102, such as to a support structure of the display module 102, so that the plate 106 can slide or translate between the latched position and the unlatched position, also referred to as being "slidably coupled" to the display module 102. In the example shown in FIGS. 3A-3C and 4A-4C, the plate 106 is slidably coupled to a rear face 112 of the display module 102. In an example, the rear face 112 is formed by one or more generally rear-facing surfaces of a support structure of the display module 102, which can be similar to the support structure or frame 20 described above with respect to the display modules 12 (FIG. 2). Those of skill in the art will appreciate, however, that the plate 106 is not required to be coupled to the rear face 112 of the display module 102, but rather can be coupled anywhere on the display module 102 so long as it does not interfere with operation of the display module 102 to generate the display image or with the operation of the latch mechanism 100. For example, the plate 106 (as well as some or all of the rest of the latch mechanism 100) can be housed within an interior of the display module 102 without varying from the scope of the present disclosure.

In an example, the slidable coupling of the plate 106 to the display module 102 is such that the plate 106 maintains its alignment relative to the display module 102, e.g., so that the plate 106 does not tilt relative to the rear face 112 of the display module 102 onto which the plate 106 is coupled as the plate 106 slides between the latched position and the unlatched position. For example, as shown in FIGS. 3A-3C and 4A-4C, the plate 106 can be planar or substantially planar (as noted above) and can be configured so that it is parallel or substantially parallel to the rear face 112 of the display module 102 (which may also be planar or substantially planar or include at least one major surface that is planar or substantially planar). Those of skill in the art will appreciate that this parallel or substantially parallel alignment can ensure that the plate 106 is parallel or substantially parallel to the front face 110 of the display module 102 (which, in an example, is parallel or substantially parallel to the rear face 112). This, in turn, will mean that when a front surface of the install tool 108 is placed against the front face 110, the plate 106 will also be parallel or substantially parallel to a primary plane of the magnet or magnetic device of the install tool 108, e.g., the primary plane for the magnetic field that is generated by the install tool 108 (also referred to as the "primary magnetic plane"). This parallel or substantially parallel orientation of the plate 106 relative to the install tool 108 can maximize the magnetic engagement therebetween, which can be particularly important in examples where the plate 106 is coupled to the rear face 112 and the latched position of the plate 106 is even further rearward from the rear face 112 while the install tool 108 is placed on the front face 110 (as in the examples of FIGS. 3A-3C and 4A-4C) such that the plate 106 is spaced from the install tool 108 be a substantial gap. This gap can make it harder to reliably predict or control the motion of the plate 106 from the latched position to the unlatched position, which in turn can make operation of the mechanical latch mechanism 100 more challenging. However, by maintaining a parallel or substantially parallel relationship between the plate 106 and the primary magnetic plane can provide for more magnetic engagement between the install tool 108 and the plate 106 over a larger area of the plate 106 and a uniform or substantially uniform magnetic force exerted between the install tool 108 and the plate. This, in turn, can result in more predictable and better controlled movement of the plate 106 as it moves from the latched position to the unlatched position (or vice versa) due to the magnetic force.

In an example, the latch mechanism 100 includes one or more structures that can maintain or substantially maintain a specified orientation of the plate 106 relative to the display module 102, e.g., to maintain the parallel or substantially parallel alignment between the plate 106 and the rear face 112 throughout or substantially throughout the motion of the plate 106 from the latched position to the unlatched position and vice versa. As will be appreciated, maintaining the alignment of the plate 106 throughout this motion can ensure or substantially ensure that the magnetic force between the install tool 108 and the plate 106 will be applied uniformly or substantially uniformly during the motion of the plate 106 between the latched position and the unlatched position. In the example shown in FIGS. 3A-3C and 4A-4C, the latch mechanism 100 includes one or more alignment pegs 114 that are each inserted through a corresponding alignment bore 116 in the plate 106 (shown in FIGS. 4A-4C). The interaction between the alignment pegs 114 and the alignment bores 116 can maintain a desired alignment of the plate 106 relative to the display module 102 during motion of the plate 106 between the latched and unlatched positions and, in some examples, can also maintain the relatively position of the plate 106 relative to the display module 102 during this motion (e.g., the position of the plate 106 along the rear face 112 of the display module 102). The cross-sectional shape of each alignment peg 114 substantially matches the cross-sectional shape of the alignment bore 116 that corresponds to that alignment peg 114, such as by both being circular or general circular (as can best be seen in FIGS. 3A-3C) so that the alignment pegs 114 are circular or generally circular cylindrical pegs 114 that are each inserted through a substantially matching circular or generally circular cylindrical bore 116. Cross-sectional shapes other than circular or generally circular can be used without varying from the scope of the present disclosure. Also, all of the alignment pegs 114 and all of the alignment bores 116 need not all have the same cross-sectional shape so long as each corresponding pair of an alignment peg 114 and its corresponding alignment bore 116 have substantially the same cross-sectional shape in order to maintain the alignment of the plate 106.

In the example shown in FIGS. 3A-3C and 4A-4C, the alignment pegs 114 extend rearward from the rear face 112 such that each alignment peg 114 is normal or substantially normal to the rear face 112 (which, as described above, may be planar or substantially planar) and such that each alignment peg 114 is parallel or substantially parallel with all of the other alignment pegs 114. Similarly, each alignment bore 116 extends through the plate 106 such that each bore 116 is normal or substantially normal to the plane of the plate 106 and so that each alignment bore 116 is parallel or substantially parallel to all of the other alignment bores 116. In this way, when the alignment pegs 114 are inserted through their corresponding alignment bores 116, the pegs 114 and bores 116 will interact in a way such that the planar or substantially planar plate 106 is parallel or substantially parallel to the rear face 112 of the display module 102. The length of the alignment pegs 114 are such that this alignment of the plate 106 relative to the rear face 112 will be maintained throughout the desired range of motion of the plate 106 between the latched position and the unlatched position.

The latch mechanism 100 also includes one or more linkage mechanisms 118 (also referred to simply as a "linkages 118"). The one or more linkages 118 provide a mechanical connection between the plate 106 and a latching member 120 that engages a corresponding mating structure 122 on the support chassis 104. In an example, when the plate 106 is in the latched position (e.g., a rear-most position relative to the display module 102 as in FIGS. 3A and 4A), than each linkage 118 causes the latching member 120 to be in a corresponding latched position wherein the latching member is engaged with the corresponding mating structure 122 of the support chassis 104. When the plate 106 is moved from the latched position toward the unlatched position (e.g., toward a forward position relative to the display module 102, as indicated by the arrow 124 in FIGS. 3B, 4B, and 4C), the linkage 118 causes the latching member 120 to move to a corresponding unlatched position (e.g., toward the plate 106, as indicated by the arrows 126 in FIGS. 3B, 4B, and 4C), wherein the motion 126 of the latching member 120 from the corresponding latched position to the corresponding unlatched position moves the latching member 120 out of engagement with the mating structure 122 so that the latch mechanism 100 is no longer securing the display module 102 to the support chassis 104 and so that the display module 102 can be removed from the support chassis 104.

In the example shown in FIGS. 3A-3C and 4A-4C, the latching member 120 comprises a latch pin and the corresponding mating structure 122 comprises a latch bore in the support chassis 104 through which the latch pin can be inserted to engage the latch mechanism 100 with support chassis 104 and withdrawn to disengage the latch mechanism 100 from the support chassis 104. Therefore, for the sake of brevity and clarity, the latching member 120 will be referred to hereinafter as the "latch pin 120" and the mating structure 122 will be referred to as the "latch bore 122." In the example best seen in FIGS. 4A-4C, a pin guide 123 can also be included to ensure that the latch pin 120 remains aligned with the latch bore 122 as it moves between the corresponding latched position and the corresponding unlatched position. The pin guide 123 can be coupled to the display module 102, for example by being connected to the rear face 112 of the display module 102.

Those of skill in the art will appreciate that structures other than a latch pin and a latch bore can be used for the latching member 120 and the corresponding mating structure 122 without varying from the scope of the present disclosure. For example, in the embodiment shown in FIGS. 3A-3C, the top-most latch pin 120 does not engage with a bore in the closest portion of the support chassis 104, but rather is positioned behind a section of the support chassis 104 when the latch mechanism 100 is in the latched state, e.g., when the latch pin 120 is in the corresponding latched position.

As described above, in an example, the motion of the plate 106 as it moves from the latched position to the unlatched position is in a forward direction that is normal to or substantially normal to the display module 102 (e.g., normal or substantially normal to the rear face 112 of the display module 102), as is shown by the arrow 124 in FIGS. 3B, 4B, and 4C. When the plate 106 moves from the unlatched position to the latched position, than it moves in generally the opposite direction (e.g., rearward), which is also normal or substantially normal to the plane of the display module 102. In an example, each of the one or more linkages 118 translates the motion of the plate 106 that is normal or substantially normal to the display module 102 (e.g., the direction of the arrow 124) into a lateral motion for the movement of the latch pins 120 from the corresponding latched position toward the corresponding unlatched position (or vice versa), e.g., as shown by the arrows 126 in FIGS. 3B, 4B, and 4C. In an example, the direction of the lateral motion 126 of the one or more latch pins 120 is parallel or substantially parallel to the display module 102 (e.g., parallel or substantially parallel to the rear face 112 of the display module 102).

In an example, best seen in FIGS. 4A-4C, each of the one or more linkages 118 provides for the translation of the normal or substantially normal motion of the plate 106 to the linear or substantially linear motion of the one or more latch pins 120 via a pivoting member 128 that is pivotally connected to the display module 102 and that is also connected to the plate 106 and to the latch pin 120. In an example, the pivoting member 128 is pivotally connected to the rear face 112 of the display module 102 with a pivot pin 130 about which the pivoting member 128 rotates. As can be seen by the transition between FIGS. 3A and 3B or from FIG. 4A to FIG. 4B and then FIG. 4C, as the plate 106 moves from the latched position to the unlatched position, the connection between the plate 106 and the pivoting member 128 causes the pivoting member 128 to pivot relative to the display module 102, e.g., about the pivot pin 130. The pivoting of the pivoting member 128, in turn, moves the latch pin 120 from the corresponding latched position to the corresponding unlatched position because of the connection between the pivoting member 128 and the latch pin 120. Similarly, when the plate 106 moves from the unlatched position to the latched position, it rotates the pivoting member 128, which in turn moves the latch pin 120 from the corresponding unlatched position to the corresponding latched position.

The pivoting member 128 can be connected to the plate 106 at a first location on the pivoting member 128, such as at or proximate to a first end of the pivoting member 128, and the pivoting member 128 can be connected to the to the latch pin 120 at a second location on the pivoting member 128, such as at or proximate to a second end of the pivoting member 128 that is generally opposite to the first end to which the plate 106 is connected. In an example, the pivoting member 128 is connected to the plate 106 with a first connecting pin 132 and is connected to the latch pin 120 with a second connecting pin 134.

In the example shown in FIGS. 4A-4C, the pivoting member 128 is angled or otherwise bent, e.g., as an L-shaped member, such that the first location to which the plate 106 is connected (e.g., at or proximate to the first end of the pivoting member 128) is not aligned with the second location to which the latch pin 120 is connected (e.g., at or proximate to the second end of the pivoting member 128). An angled or bent pivoting member 128 can provide a designer of the display module 102 and the latch mechanism 100 some flexibility depending on the desired motion of the plate 106 as it moves between the latched and unlatched positions and of the latch pin 120 as it moves between the corresponding latched position and corresponding unlatched position.

In the example shown in FIGS. 4A-4C, the pivoting member 128 comprises an L-shaped member shaped generally as a capital L, e.g., with a longer leg and a shorter leg being angled relative to one another by an angle that is generally or approximately equal to 90° (e.g., a right angle). In the example of FIGS. 4A-4C, the pivoting member 128 is connected to the display module 102 at the right angle of the L, e.g., with the pivot pin 130, the plate 106 is connected at or proximate to the end of the longer leg of the L, e.g., with the first connecting pin 132, and the latch pin 120 being connected at or proximate to the end of the shorter leg of the L, e.g., with the second connecting pin 134.

In an example, best seen in FIGS. 4A-4C, the display module 102 can include one or more structures to receive at least a portion of the plate 106 as it moves into the latched position or the unlatched position. For example, as shown in FIGS. 4A-4C, the display module 102 can include a recess 136, for example in the rear face 112 to which the plate 106 is coupled. The recess 136 receives at least a portion of the plate 106 when the plate 106 moves into the unlatched position, as shown in FIG. 4C. However, as will be appreciated by those in the art, the latch mechanism 100 could be configured so that the recess 136 receives the plate 106 when it moves into the latched position rather than the unlatched position. In the example shown in FIGS. 4A-4C, a shoulder 138 is connected to the plate 106 for each of the one or more linkages 118, and the connecting pin 132 is connected to the shoulder 138 rather than directly to the plate 106 (e.g., such that the linkage 118 is connected to the plate 106 via the shoulder 138). The shoulder 138 allows the point where the linkage 118 is connected (e.g., where the pivoting member 128 is connected with the connecting pin 132) to be spaced from the main body of the plate 106 so that as the plate 106 is received by the recess 136, the sides of the recess 136 or the rear face 112 of the display module 102 does not interfere with the motion of the linkage 118 transferring the motion of the plate 106 to the latch pin 120 or with the motion of the latch pin 120 as it moves between the corresponding latched position and the corresponding unlatched position.

In examples where one or more alignment pegs 114 are included to maintain an alignment of the plate 106 relative to the display module 102 (described above), the alignment pegs 114 can limit lateral motion of the plate 106 relative to the display module 102 (e.g., along the rear face 112). In an example, the connection between the pivoting member 128 and the plate 106 or between the pivoting member 128 and the latch pin 120, or both, is configured to accommodate the limited lateral motion of the plate 106 that results from the alignment pegs 114. For example, one or both of the connecting pins 132, 134 can be coupled to the pivoting member 128 in a way that allows the connecting pin 132 or 134 to slide relative to the pivoting member 128 or relative to the plate 106 (for the first connecting pin 132) or to the latch pin 120 (for the second connecting pin 134). For example, the pivoting member 128 in FIGS. 4A-4C includes a slot 140 in the pivoting member 128 at the first location (e.g., at or proximate to the first end of the pivoting member 128) so that the connecting pin 132 can slide along a portion of the length of the pivoting member 128 as it pivots due to the motion of the plate 106 between the latched and unlatched positions. In the example shown in FIGS. 4A-4C, the connecting pin 132 is rigidly connected to the plate 106, for example by being welded or otherwise secured to the shoulder 138, and is held within the slot in a way that allows the connecting pin 132 to slide along the length of the slot 140. As shown in the example FIGS. 4A-4C, as the pivoting member 128 rotates about the pivot pin 130, the connecting pin 132 slides from a distal end of the slot 140 toward a proximate end of the slot 140, particularly when the plate 106 is in the intermediate position shown in FIG. 4B when the portion of the pivoting member 128 that includes the slot 140 (e.g., the longer leg of the L in the example configuration shown in FIGS. 4A-4C) is parallel or close to parallel with the plate 106. As the pivoting member 128 rotates further so that the portion with the slot 140 is no longer parallel with the plate 106, the connecting pin 132 begins to slide back toward the distal end of the slot 140 (as shown in FIG. 4C).

A slot at the first end of the pivoting member 128 is not the only way that this accommodation for the limited motion of the plate 106 can be provided, and those of skill in the art will appreciate that alternative configurations could be used. For example, the slot 140 could be located so that the second connecting pin 134 for the latch pin 120 slides along the slot 140 instead of or in addition to the slot 140 for the first connecting pin 132 for the plate 106, such as by placing the slot 140 at or proximate to the second end of the pivoting member 128 rather than or in addition to at or proximate to the first end as is shown for the slot 140 in FIGS. 4A-4C. Alternatively, one or both of the connecting pins 132 and 134 can be securely connected to the pivoting member 128, and one or both of the plate 106 (or the shoulder 138) and the latch pin 120 can include a slot along which the first connecting pin 132 or the second connecting pin 134, or both, can slide. Those of skill in the art will also appreciate that mating structures other than a connecting pin and a slot can be used, including, but not limited to, a channel or interior bore though which a mating member can slide, or a bushing or sleeve that can slide along a solid bar or member.

As described above, the plate 106 is moved from a first position to a second position, such as from the latched position to the unlatched position, when the install tool 108 magnetically engages the plate 106 such that the resulting magnetic force is sufficient to move the plate 106. In some examples, it may be desired that the plate 106 be kept in the first position whenever the install tool 108 is not being used, e.g., so that the plate 106 will remain in the latched position, which in turn will keep the latch pin 120 in the corresponding latched position unless and until the install tool 108 is positioned such that it moves the plate 106 to the unlatched position. In other words, it may be desirable for there to be a "default" position for the plate 106 that the plate 106 will be in and will return to if the install tool 108 is not being used. In some examples, it will be preferable for this "default" position to be the latched position, for example so that unless a user is intending to remove the display module 102 from engagement with the support chassis 104 the latch mechanism 100 will remain in the latched state in order to mechanically secure the display module 102 to the support chassis 104.

In an example where a default position is desired, the latch mechanism 100 can include one or more biasing structures that generates a biasing force that acts in a direction that will tend to move the plate 106 toward the default position, such as by pushing or pulling the plate 106 toward the latched position. When the display module 102 includes the one or more biasing structures, the install tool 108 is configured such that when it is positioned properly, the resulting magnetic force generated between the install tool 108 and the plate 106 is of sufficient magnitude to overcome the biasing force generated by the one or more biasing structures so that the plate 106 will move out of the default position and toward another position. For example, if the desired default position for the plate 106 is the latched position, as described above, than the one or more biasing structures will be positioned and configured so that the biasing force will act to push or pull the plate 106 toward the latched position (e.g., will push or pull the plate rearward relative to the display module 102 in FIGS. 4A-4C). When the install tool 108 is used, the magnetic force is sufficient to overcome the biasing force and to move the plate 106 to the unlatched position (e.g., to move the plate forward relative to the display module 102 in FIGS. 4A-4C).

In the example shown in FIGS. 4A-4C, the one or more biasing structures comprise one or more springs 142, such as one or more compression springs 142. In the example of FIGS. 4A-4C, the springs 142 are positioned between the plate 106 and the rear face 112 of the display module 102 in a compressed state so that the springs 142 will generate a spring force that pushes the plate 106 rearward toward the latched position. In this example, when the install tool 108 is used, a magnetic attraction is generated between the install tool 108 and the plate 106 that pulls the plate 106 against the spring force of the springs 142, which causes the plate 106 to further compress the springs 142 between the rear face 112 and the plate 106 (as shown in FIGS. 4B and 4C). Once the install tool 108 is removed such that the magnetic attraction force is no longer present, the constraint on the compressed springs 142 is released and the spring force is allowed to act on the plate 106 and push the plate 106 rearward relative to the display module 102 back to the latched position. The one or more biasing structures are not limited to compression springs, however, and those of skill in the art will appreciate that other biasing structures can be used including, but not limited to: tension springs, resilient tension members (such as elastic cords or bands), or resilient compression members (such as resilient polymer materials that can be compressed but will return to their original shape when a compression force is removed).

As described above with respect to the display 10 of FIGS. 1 and 2, each display module 12 can be secured to a support chassis 14 with one or more primary mounts that provide the main support for the display module 12 and the main connection between the display module 12 and the support chassis 14. As is also described above, the display 10 can also include one or more secondary mounts (e.g., one or more safety structures or safety latches) to provide a backup or redundancy to the primary mounts. The magnetically-actuated latch mechanism 100 described with respect to FIGS. 3A-3C and 4A-4C can be used as one or more of the primary mounts or can be used as a safety latch, or both.

In an example, each of one or more primary mounts comprises, but is not limited to: a mounting latch, a fastener, a magnet, or a magnetically-engageable structure and the example magnetically-actuated latch mechanism 100 of FIGS. 3A-3C and 4A-4C is used as a safety latch. In an example, each primary mount comprises one or more magnets 144 that are located on or in the display module 102 (referred to hereinafter as the "module magnets 144" for brevity) and one or more corresponding mating magnetically-engageable structures 146 that are located on or in the support chassis 104 (referred to hereinafter as the "chassis mating structures 146" for brevity).

As used herein, the term "magnetically-engageable structure" (as with the chassis mating structure 146) refers to a structure comprising at least one material that can be magnetically engaged by the module magnet 144 in order to hold the display module 102 to the support chassis 104. The term "magnetically engage" and similar terms such as "magnetic engagement" when referring the module magnet 144 and the chassis mating structure 146, refer to the generation of a magnetic attraction force being formed between the module magnet 144 and the chassis mating structure 146.

In an example, the magnetic attraction force has sufficient magnitude so that collectively the plurality of sets of module magnets 144 and chassis mating structures 146 can support the weight of the display module 12 without the use of any additional fastening or coupling structures other than the module magnets 144 and the corresponding chassis mating structures 146. In other words, in an example this magnetic attraction force is sufficient such that the corresponding sets of the module magnets 144 and the chassis mating structures 146 act as the primary mounts for the display module 102. In such an example, the magnetic force between the install tool 108 and the plate 106 of the latch mechanism 100 can be selected so that it is stronger than the collective magnitude of the magnetic attraction force between the module magnets 144 and the chassis mating structures 146. A stronger magnetic force between the install tool 108 and the plate 106 will allow the install tool 108 to not only move the plate 106 in order to change the latch mechanism 100 from the latched state to the unlatched state, but it will also act as a holding force to hold the entire display module 102 onto the install tool 108, and the user can than pull on the install tool 108 with enough force to break the magnetic engagement between the module magnets 144 and the chassis mating structures 146 and pull the entire display module 102 away from the support chassis 104.

In some examples, the magnetically-engageable structure of the chassis mating structure 146 can be a second magnet that is configured and oriented to be magnetically attracted to the module magnet 144, or the magnetically-engageable structure of the chassis mating structure 146 can comprise a magnetizable material that can be magnetically engaged by the module magnet 144 but that does not generate its own magnetic field, such as a magnetizable metal or polymer or a composite material that includes at least one magnetizable material.

Those of skill in the art will appreciate that a primary mount that uses magnets is not required to have a magnet be in or on the display module 102, as with the one or more module magnets 144. Rather, each primary mount can comprise one or more magnets located in or on the support chassis 104 that magnetically engage one or more corresponding mating magnetically-engageable structures that are in or on the display module 102. In other words, the location of the magnet and the mating magnetically-engageable structure can be reversed, for example as if the module magnets 144 were actually placed in the location where the chassis mating structures 146 is shown in FIGS. 4A-4C and the magnetically-engageable material of the chassis mating structure 146 were actually placed in the location where the module magnet 144 is shown in FIGS. 4A-4C.

In this example, the module magnets 144 and corresponding chassis mating structures 146 provide for the primary support of the weight of the display module 102 during normal use and the latch mechanism 100 described above is used primarily as a redundant backup securing structure, e.g., as a safety latch. The redundant securing by the latch mechanism 100 can keep the display module 102 at least loosely secured to the support chassis 104 even if the securing by the module magnets 144 and chassis mating structures 146 fails, such as if the display module 102 is being used in an outdoor display and very high winds are strong enough to break the magnetic attraction between the module magnets 144 and the chassis mating structures 146. In some examples, the latch mechanism 100 can keep the display module 102 in close enough proximity to the support chassis 104 so that if an event like high winds were to break the magnetic attraction, once the high winds or other event cease, the module magnets 144 are close enough to their corresponding chassis mating structures 146 that the magnetic attraction force can be reestablished and the display module 102 can be pulled back into its desired location on the support chassis 104 by the magnetic attraction force.

Figure 6:
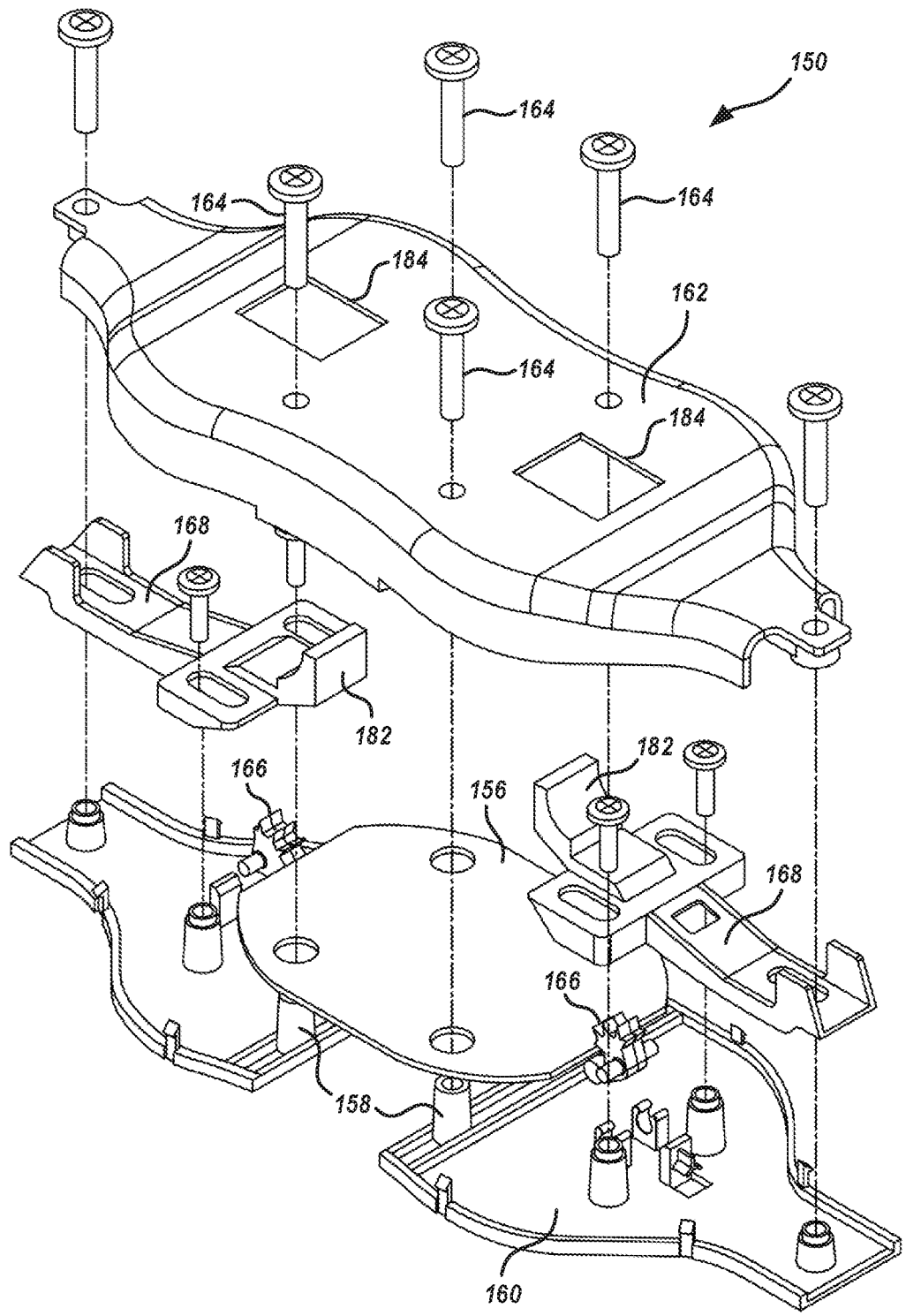
FIG. 6 is an exploded perspective view of the example magnetically-actuated latch mechanism of FIG. 5.
Figure 7:
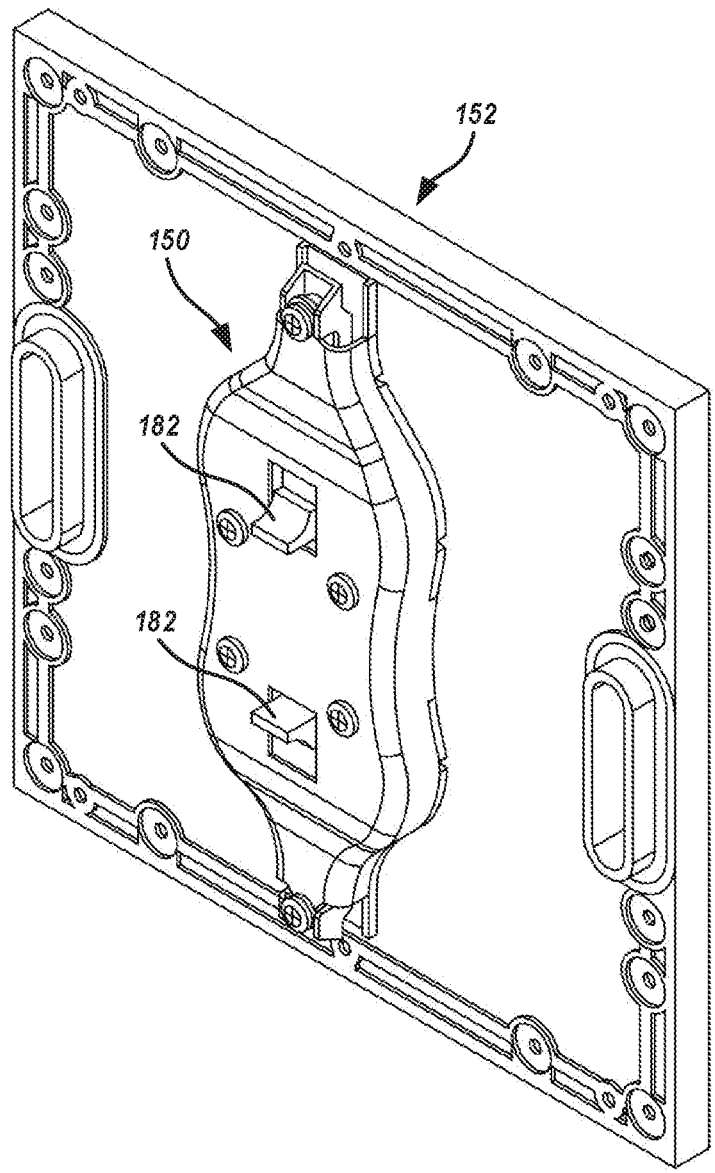
FIG. 7 is a rear perspective view of an example display module with the example magnetically-actuated latch mechanism of FIG. 5 attached thereto.
Figure 8:
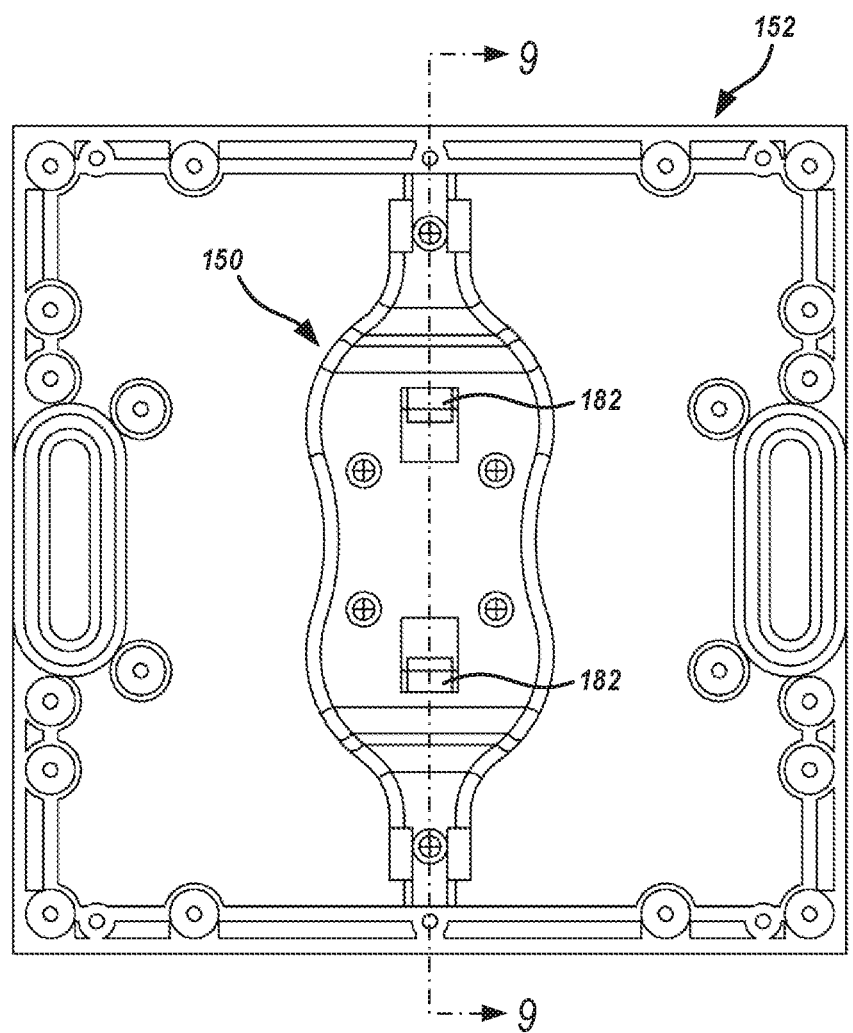
FIG. 8 is a rear elevation view of the example display module of FIG. 7.
Figure 9:
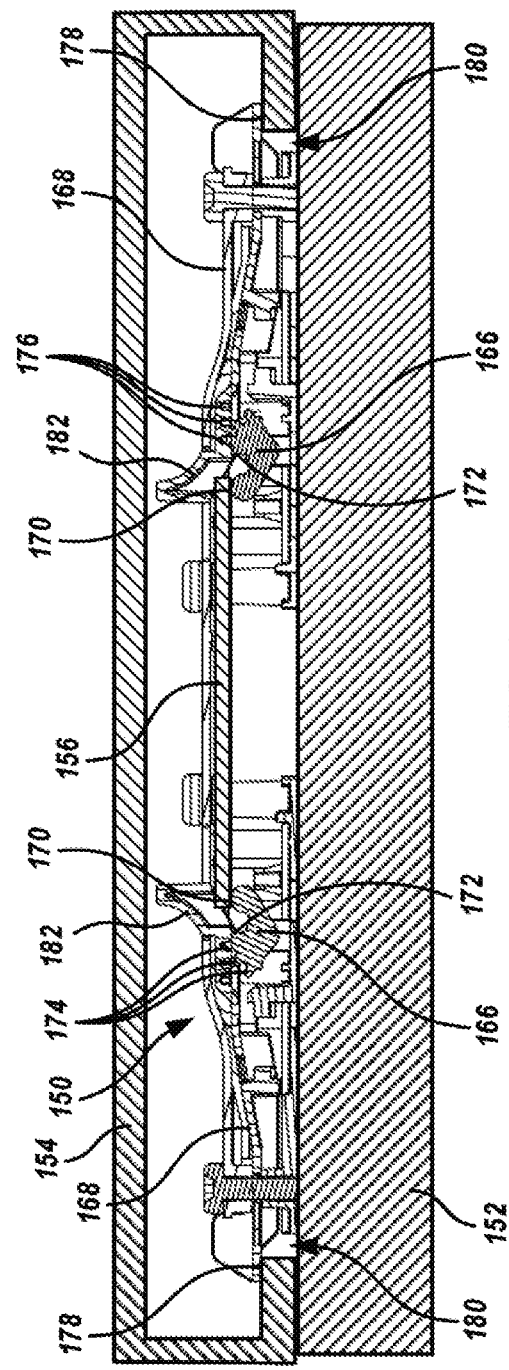
FIG. 9 is a cross-sectional view of the example display module and magnetically-actuated latch mechanism taken along line 9-9 in FIG. 8, with the magnetically-actuated latch mechanism being in a latched configuration and engaging a support chassis.
Figure 10:
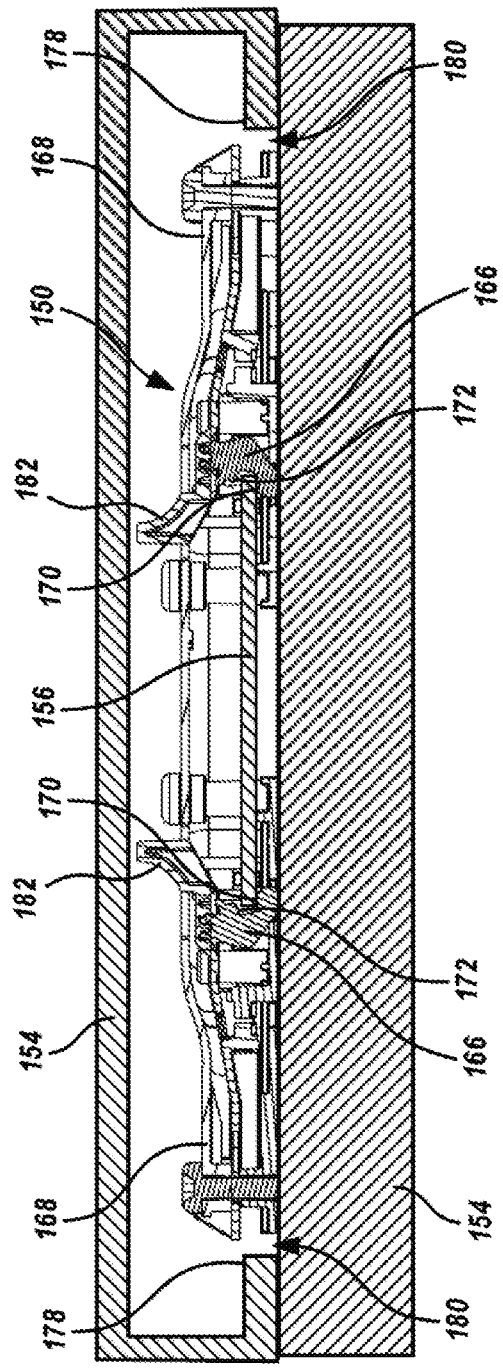
FIG. 10 is a cross-sectional view of the example display module and magnetically-actuated latch mechanism shown in FIG. 9 with the magnetically-actuated latch mechanism in an unlatched configuration that is not engaging the support chassis.

FIGS. 5-10 show details of another example magnetically-actuated latch mechanism 150 that operates in a similar manner to the latch mechanism 100 shown and described above with respect to FIGS. 3A-3C and 4A-4C. Like the latch mechanism 100, the magnetically-actuated latch mechanism 150 (referred to hereinafter simply as the "latch mechanism 150" for brevity) can be mounted to a display module 152 (as seen in FIGS. 7-10) in order to selectively couple to display module 152 to a support chassis 154 (as seen in FIGS. 9 and 10). Similar to the latch mechanism 100, the latch mechanism 152 can include a movable member 156 (e.g., as seen in FIG. 6), such as a planar or substantially planar body that will also be referred to as "the movable plate 156" or simply "the plate 156," that is movable between a latched position and an unlatched position corresponding to a latched state and an unlatched state of the latch mechanism 150. The plate 156 can be slidably coupled to the rest of the latch mechanism 150. For example, the plate 156 is shown as being retained on a plurality of posts 158 such that the plate 156 can slide up and down along the posts 158 between the latched position and the unlatched position. In an example, the posts 158 are coupled to a lower housing 160 and a set of corresponding threaded fasteners 164 are inserted through a corresponding upper housing 162 and into the posts 158. In an example, the posts 158 maintain an orientation of the plate 156 relative to the lower and upper housings 160 and 162 (collectively referred to as "the housing 160, 162") of the latch mechanism 150, e.g., so that the plate 156 is parallel or substantially parallel to the lower housing 160 and the upper housing 162.

Similar to the latch mechanism 100, the plate 156 is moved by magnetic engagement between the plate 156 and a corresponding module installation and de-installation tool, also referred to simply as an "install tool." The install tool is not shown in FIGS. 5-10, but it will be understood that the install tool that is used with the latch mechanism 150 of FIGS. 5-10 can be similar or identical to the install tool 108 described above with respect to the latch mechanism 100 in FIGS. 3A-3C and 4A-4C.

Similar to the latch mechanism 100, the latch mechanism 150 includes one or more linkage mechanisms 166 (also referred to simply as "linkages 166"), which provide a mechanical connection between the plate 156 and a latching member 168, which in turn can engage a portion of the support chassis 154 (as seen in FIGS. 9 and 10). The primary difference between the linkages 118 and the latching members 120 of the latch mechanism 100 and the linkages 166 and the latching members 168 of the latch mechanism 150 is the mechanism by which each linkage 166 interacts with the plate 156 and with a corresponding latching member 168. As described above, the linkages 118 are directly and pivotally connected to the plate 106. As is best seen in FIGS. 9 and 10, he linkages 166 are not directly connected to the plate 156, but rather are pushed by the plate 156 as it moves from the latched position (shown in FIG. 9) to the unlatched position (shown in FIG. 10). In the example shown, the plate 156 pushes onto a first bearing surface 170 on the linkage 166 as the plate 156 moves forward from the latched position toward the unlatched position (e.g., when the plate 156 is magnetically engaged by an install tool) to rotate the linkage 166 from a corresponding latched position toward a corresponding unlatched position. When the plate 156 moves from the unlatched position toward the latched position (e.g., from the position shown in FIG. 10 toward the position shown in FIG. 9), the plate 156 pushes onto a second bearing surface 172 to rotate the linkage 166 from the corresponding unlatched position toward the corresponding latched position. As shown in the example of FIGS. 9 and 10, the first bearing surface 170 and the second bearing surface 172 can form a small pocket in the linkage 166 that can receive the plate 152 as it moves from the latched position to the unlatched position or vice versa.

As shown in FIGS. 9 and 10, in an example the linkage 166 includes a plurality of gear teeth 174 that each engage with a corresponding gear pocket 176 in the latching member 168. As the linkage 166 is rotated, e.g., after being pushed on a bearing surface 170 or 172 by the plate 156, the gear teeth 174 engage the corresponding gear pockets 176 to push the latching member 168 either toward its unlatched position (if the linkage 166 is being rotated toward the corresponding unlatched position) or toward its latched position (if the linkage 166 is being rotated toward the corresponding latched position), similar to a rack and pinion actuator. Although FIGS. 9 and 10 show the gear teeth 174 as being located on the linkage 166 and the corresponding gear pockets 176 being located on the latching member 168, those of skill in the art will appreciate that the arrangement can be reversed, with gear teeth being located on the latching mechanism and corresponding gear pockets being located on the linkage 166 without varying from the scope of the present disclosure.

As shown in FIGS. 9 and 10, when the plate 156 is in a latched position (e.g., a rearward position relative to the display module 152 as shown in FIG. 9), the linkages 166 position the latching member 168 so that it engages the support chassis 154, for example at an edge 178 of an opening 180 within the support chassis 154 as shown in FIG. 9. When the plate 156 is moved to the unlatched position (e.g., when the plate 156 is magnetically engaged by an install tool), the linkages 166 move the latching members 168 inward so that the latching members 168 are no longer engaging the support chassis 154 (e.g., so that the latching members 168 are no longer engaged with the edge 178 of the opening 180 in the support chassis 154). When this occurs, the entirety of the latch mechanism 150, including the retracted latching members 168, can be pulled through the opening 180 and the display module 152 can be separated from the support chassis 154.

In an example, the latch mechanism 150 can include one or more handles 182 each coupled to a corresponding one of the one or more latching members 168, to a corresponding one of the linkages 166, or to the plate 156. Each of the handles 182 allow a user to manually move the corresponding latching member 168 to one or both of the latched position or to the unlatched position, either directly or via its mechanical connection to one of the linkages 166 and to the plate 156. For example, as shown in the embodiment of FIGS. 5-10, each latching member 168 includes a handle 182 coupled thereto, wherein the handles 182 protrude out of the housing 160, 162 through corresponding openings 184 (e.g., in the upper housing 162). The handles 182 that protrude from the housing 160, 162 through the openings 184 allow the user to move the latching members 168 toward the unlatched position in the example shown in FIGS. 9 and 10, e.g., by pinching the handles with the user's thumb and index finger to pull the latching members 168 inward and out of engagement with the edge 178 of the support chassis 154 surrounding the opening 180.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A display module comprising:
   a module support structure comprising a front face and a planar or substantially planar rear face;
   a plurality of light-emitting elements coupled to the front face of the module support structure; and
   a latch mechanism coupled to the planar or substantially planar rear face of the module support structure and configured to removeably couple the module support structure to a support chassis, wherein the latch mechanism includes:
      a planar or substantially planar movable member comprising a magnetizable structure that is magnetically engageable by a magnet or magnetic device of a tool, wherein the movable member is movable between a first movable member position and a second movable member position, and wherein the movable member is moved from the first movable member position to the second movable member position when the magnet or magnetic device of the tool magnetically engages the magnetizable structure of the movable member;

one or more alignment members to maintain an alignment of the movable member relative to the module support structure so that the movable member is parallel or substantially parallel to the planar or substantially planar rear face during movement between the first movable member position and the second movable member position;

a first latch member movable between a first latch member first position and a first latch member second position, wherein the first latch member is in position to engage a first mating structure of the support chassis when the first latch member is in the first latch member first position;

a first linkage mechanism mechanically connecting the first latch member to a first location on the movable member so that the movable member and the first latch member move together such that the first latch member is in the first latch member first position when the movable member is in the first movable member position and is in the first latch member first position when the movable member is in the second movable member position;

a second latch member movable between a second latch member first position and a. second latch member second position wherein the second latch member is in position to engage a second mating structure of the support chassis when the second latch member is in the second latch member first position; and a second linkage mechanism mechanically connecting the second latch member to a second location on the movable member so that the movable member and the second latch member move together such that the second latch member is in the second latch member first position when the movable member is in the first movable member position and is in the second latch member second position when the movable member is in the second movable member position.

2. A display module according to claim 1, wherein:
the movable member is movable in a first direction between the first movable member position and the second movable member position;
the first latch member is movable in a second direction between the first latch member first position and the first latch member second position, wherein the second direction is different from the first direction; and
the first linkage mechanism translates motion of the movable member in the first direction between the first movable member position and the second movable member position to motion in the second direction for the first latch member between the first latch member first position and the first latch member second position.

3. A display module according to claim 1. wherein the first linkage mechanism comprises a linkage member that is pivotally coupled to one or both of the movable member or the first latching member.

4. A display module comprising:
a module support structure,
a plurality of light-emitting elements coupled to a front face of the module support structure; and a latch mechanism coupled to the module support structure and configured to removeably couple the module support structure to a support chassis. wherein the latch mechanism includes:

a movable member comprising a magnetizable structure that is magnetically engageable by a magnet or magnetic device of a tool, wherein the movable member is movable between a first movable member position and a second movable member position, and wherein the movable member is moved from the first movable member position to the second movable member position when the magnet or magnetic device of the tool magnetically engages the magnetizable structure of the movable member, a latch member movable between a first latch member position and a second latch member position, wherein the latch member is in position to engage a mating structure of the support chassis when the latch member is in the first latch member position: and a linkage mechanism mechanically connecting the movable member to the latch member so that the movable member and the latch member move together such that the latch member is in the first latch member position when the movable member is in the first movable member position and is in the second latch member position when the movable member is in the second movable member position, wherein the linkage mechanism comprises a plurality of gear teeth coupled to one of the movable member or the latching member and a plurality of gear pockets on or in the other of the movable member or the latching member, wherein each of the plurality of gear teeth engage with a corresponding one of the plurality of gear pockets to move the latch member between the first latch member position and the second latch member position.

5. A display module according to claim 4, wherein the module support structure comprises a planar or substantially planar rear face onto which the latch mechanism is mounted, wherein the movable member is planar or substantially planar, and wherein the movable member is parallel or substantially parallel to the rear face during movement between the first movable member position and the second movable member position.

6. A display module according to claim 1, wherein the latch mechanism further comprises one or more biasing structures to bias the movable member toward the first movable member position or toward the second movable member position.

7. A display module according to claim 1, wherein the latch mechanism is a primary mount for coupling the display module to the support chassis, wherein the display module further comprises a secondary mount for redundantly coupling the display module to the support chassis.

8. A display module according to claim 1, wherein the latch mechanism is a secondary mount for mounting the display module to the support chassis, wherein the display module further comprises one or more primary mounts to couple the display module to the support chassis.

9. A display module according to claim 8, wherein the one or more primary mounts comprise one or more magnets mounted to the module support structure and one or more corresponding mating magnetically-engageable structures mounted to the support chassis.

10. A display module according to claim 8, wherein the one or more primary mounts comprise one or more magnetically-engageable structures mounted to the module support structure and one or more corresponding mating magnets mounted to the support chassis.

11. A method comprising:
mounting one or more display modules to the support chassis to form a display surface, wherein each of the one or more display modules comprises;
a module support structure;
a plurality of light-emitting elements coupled to a front face of the module support structure, wherein the front faces of the plurality of display modules are aligned or substantially aligned to form the display surface; and
a latch mechanism including;
a movable member comprising a magnetizable structure, wherein the movable member is movable between a first movable member position and a second movable member position;
a latch member movable between a first latch member position and a second latch member position, wherein the latch member engages a mating structure of the support chassis when the latch member is in the first latch member position and is disengaged from the mating structure when the latch member is in the second latch member position; and
a linkage mechanism mechanically connecting the movable member to the latch member so that the movable member and the latch member move together such that the latch member is in the first latch member position when the movable member is in the first movable member position and is in the second latch member position when the movable member is in the second movable member position,
wherein the linkage mechanism comprises a plurality of gear teeth coupled to one of the movable member or the latching member and a plurality of gear pockets on or in the other of the movable member or the latching member, wherein each of the plurality of gear teeth engage with a corresponding one of the plurality of gear pockets to move the latch member between the first latch member position and the second latch member position;
positioning a tool against the front face of a first of the one or more display modules, wherein the tool includes a magnet or magnetic device that magnetically engages with the magnetizable structure of the movable member to move the movable member from the first movable member position to the second movable member position, which in turn moves the latch member via the linkage mechanism from the first latch member position to the second latch member position; and
disengaging and separating the first of the one or more display modules from the support chassis.

12. A method according to claim 11, wherein:
the movable member is movable in a first direction between the first movable member position and the second movable member position;
the latch member is movable in a second direction between the first latch member position and the second latch member position, wherein the second direction is different from the first direction; and
the linkage mechanism translates motion of the movable member in the first direction between the first movable member position and the second movable member position to motion in the second direction for the latch member between the first latch member position and the second latch member position.

13. A method according to claim 11, wherein the linkage mechanism comprises a linkage member that is pivotally coupled to one or both of the movable member or the latching member.

14. A method according to claim 11, wherein the latch mechanism further comprises one or more biasing structures to bias the movable member toward the first movable member position or toward the second movable member position.

15. A display module according to claim 4, wherein:
the movable member is movable in a first direction between the first movable member position and the second movable member position;
the latch member is movable in a second direction between the first latch member position and the second latch member position, wherein the second direction is different from the first direction; and
the linkage mechanism translates motion of the movable member in the first direction between the first movable member position and the second movable member position to motion in the second direction for the latch member between the first latch member position and the second latch member position.

16. A display module according to claim 4, wherein the latch mechanism further comprises one or more biasing structures to bias the movable member toward the first movable member position or toward the second movable member position.

17. A display module according to claim 4, wherein the latch mechanism is a primary mount for coupling the display module to the support chassis, wherein the display module further comprises a secondary mount for redundantly coupling the display module to the support chassis.

18. A display module according to claim 4, wherein the latch mechanism is a secondary mount for mounting the display module to the support chassis, wherein the display module further comprises one or more primary mounts to couple the display module to the support chassis.

19. A display module according to claim 18, wherein the one or more primary mounts comprise one or more magnets mounted to the module support structure and one or more corresponding mating magnetically-engageable structures mounted to the support chassis.

20. A display module according to claim 18, wherein the one or more primary mounts comprise one or more magnetically-engageable structures mounted to the module support structure and one or more corresponding mating magnets mounted to the support chassis.

* * * * *